United States Patent [19]

Brown, deceased et al.

[11] Patent Number: 4,907,478

[45] Date of Patent: Mar. 13, 1990

[54] APPARATUS AND PROCESS FOR ASSEMBLING A MACHINE TOOL AND MACHINE TOOL FORMED THEREBY

[75] Inventors: Ivan R. Brown, deceased, late of Breesport, by Claudia D. Brown, executrix; Brian M. Eaton, Pine City; Robert B. Carlyle, Horseheads, all of N.Y.

[73] Assignee: Hardinge Brothers, Inc., Elmira, N.Y.

[21] Appl. No.: 118,928

[22] Filed: Nov. 10, 1987

[51] Int. Cl.$^4$ .............................................. B23Q 1/00
[52] U.S. Cl. ..................................................... 82/149
[58] Field of Search ................... 51/166 R; 408/234; 82/32, 149; 409/235, 240, 241, 286, 287, 337, 26 R, 27 R, 27 A, 150; 29/149.5, 460, 27 R

[56] References Cited

U.S. PATENT DOCUMENTS

| | | | |
|---|---|---|---|
| 2,010,557 | 8/1935 | Nenninger | 82/149 |
| 2,487,289 | 11/1949 | Yeomans | 409/162 |
| 2,739,773 | 3/1956 | Rougemont | 82/32 |
| 3,618,432 | 11/1971 | Briese | 82/2 |
| 3,749,509 | 7/1973 | Lukoshnikov | 82/32 |
| 3,800,636 | 4/1974 | Zagar | 82/149 |
| 3,837,245 | 9/1974 | Schuler et al. | 82/32 |
| 4,040,316 | 8/1977 | Gramespacher et al. | 82/149 |
| 4,539,876 | 9/1985 | Meyers | 82/32 |
| 4,593,587 | 6/1986 | Nenadal | 82/32 |
| 4,622,194 | 11/1986 | Rogers et al. | 82/149 |
| 4,626,299 | 12/1986 | Knight | 82/149 |
| 4,657,455 | 4/1987 | Rogers et al. | 82/147 |

FOREIGN PATENT DOCUMENTS

| | | | |
|---|---|---|---|
| 612610 | 8/1979 | Switzerland | 82/32 |
| 620624 | 12/1980 | Switzerland | 82/32 |

OTHER PUBLICATIONS

Toyoda Machinery U.S.A. Inc; Strength from Within; 10/87; Man P. S.

Primary Examiner—Frederick R. Schmidt
Assistant Examiner—Blynn Shideler
Attorney, Agent, or Firm—Shlesinger & Myers

[57] ABSTRACT

The process for securing a machine tool bed to a base includes the steps of providing a base having a horizontally disposed first surface wherein a plurality of cooperating grooves are disposed. A selected quantity of hardenable grout material is deposited into the grooves. A bed has a second surface from which a plurality of tongues extend, and each tongue has side surfaces which are relatively rougher than the associated distal surface. The bed is horizontally positioned above the base so that each tongue is received in an associated groove and each distal surface is spaced from the associated underlying groove, thereby causing the grout material to rise by an amount insufficient to contact the second surface. The bed is maintained spaced above the base until the grout material has hardened and thereby binds each side surface but not the associated distal surface to the base.

30 Claims, 6 Drawing Sheets

FIG_12

APPARATUS AND PROCESS FOR ASSEMBLING A MACHINE TOOL AND MACHINE TOOL FORMED THEREBY

BACKGROUND OF THE INVENTION

A lathe is a machine tool having one or more movable cutting elements which operate on a workpiece rotated by a headstock. Some machine tools have the operating components angularly disposed relative to a horizontal plane in order to allow chips, shavings, cutting fluid and the like to move away from the workpiece by gravity. The movable components are mounted to a base which is typically comprised of a metal, although cementitious bases are known.

Current machine tools can repeatedly reproduce cuts to extremely small tolerances. Naturally, it is desired to lower even these already small tolerances. The extremely small tolerances require that numerous factors affecting the machine tool and the relationship between its component parts be controlled. For example, temperature fluctuations can adversely impact machine operation due to dissimilar thermal expansion coefficients between the components. Likewise, vibrations established in the machine tool can have an impact on performance which is particularly harmful at low tolerances.

The conventional machine tool base is a rather large bulky assembly to which the operating components are attached. The bedways on which the cutting elements move are typically manufactured from metal, such as steel or cast iron, and must be secured to the base. Positive securement of a fabricated metal component to a cementitious base requires that alignment be maintained with extreme accuracy, or else the required tolerances cannot be maintained. Grouting of the metal components to a cementitious base has been used in the past, but such prior techniques did not adequately take into account the shrinkage forces generated by the grout, nor did they permit accurate leveling of the bedways.

From the above, those skilled in the art will understand that there is a need for an improved method of grouting the metallic bedways of a machine tool to the cementitious base. The resulting assembly is one having components of dissimilar thermal expansion and vibration dampening coefficients which are adequately regulated to assure repeated cuts of extremely small tolerances.

OBJECTS AND SUMMARY OF THE INVENTION

The primary object of the disclosed invention is a process for securing the metallic bedways of a machine tool to the supporting cementitious base through the use of a grout material wherein shrinkage forces are regulated to prevent vertical irregularities throughout the length of the bedway.

An additional object of the disclosed invention is a machine tool assembly utilizing components of dissimilar thermal expansion and vibration dampening characteristics in order to minimize the effects of temperature fluctuations, while selectively dampening vibrations developed through operation of the machine.

Yet a further object of the disclosed invention is a machine tool assembly wherein the bedways are mounted on uniformly spaced apart integral cementitious pedestals extending from the base in order to further improve vibration dampening.

A process for securing a machine tool bedway to a base includes the steps of providing a base having a horizontally disposed first surface, and with a plurality of cooperating grooves being disposed in the base and opening at the first surface. A selected quantity of a hardenable grout material is puddled into the grooves. A bed having a second surface from which a plurality of tongues extend is provided, and each tongue includes a distal surface and spaced side surfaces extending therefrom to the second surface. The side surfaces are relatively rougher than are the distal surfaces and the side surfaces of the grooves are likewise relatively rougher than the bottom surfaces thereof. The bed is spaced horizontally above the base so that each tongue is received in an associated groove and each distal surface is spaced from the associated underlying grooves, thereby causing the grout material to rise but by an amount insufficient to contact the second surface. The bed is maintained spaced above the base until the grout material hardens and thereby binds each side surface but not the associated distal surface to the base.

A reorientable machine tool base assembly comprises a bottom surface, a rear surface extending from the bottom surface and at least a first mounting surface angularly disposed relative to both surfaces. A plurality of first means are operably associated with the bottom and rear surfaces for orienting the base in a first position wherein the mounting surface is horizontal. A plurality of second means are operably associated with the bottom surface for orienting the base in a second position wherein the mounting surface is disposed at a substantial angle to the horizontal.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE INVENTION

Figure 1:
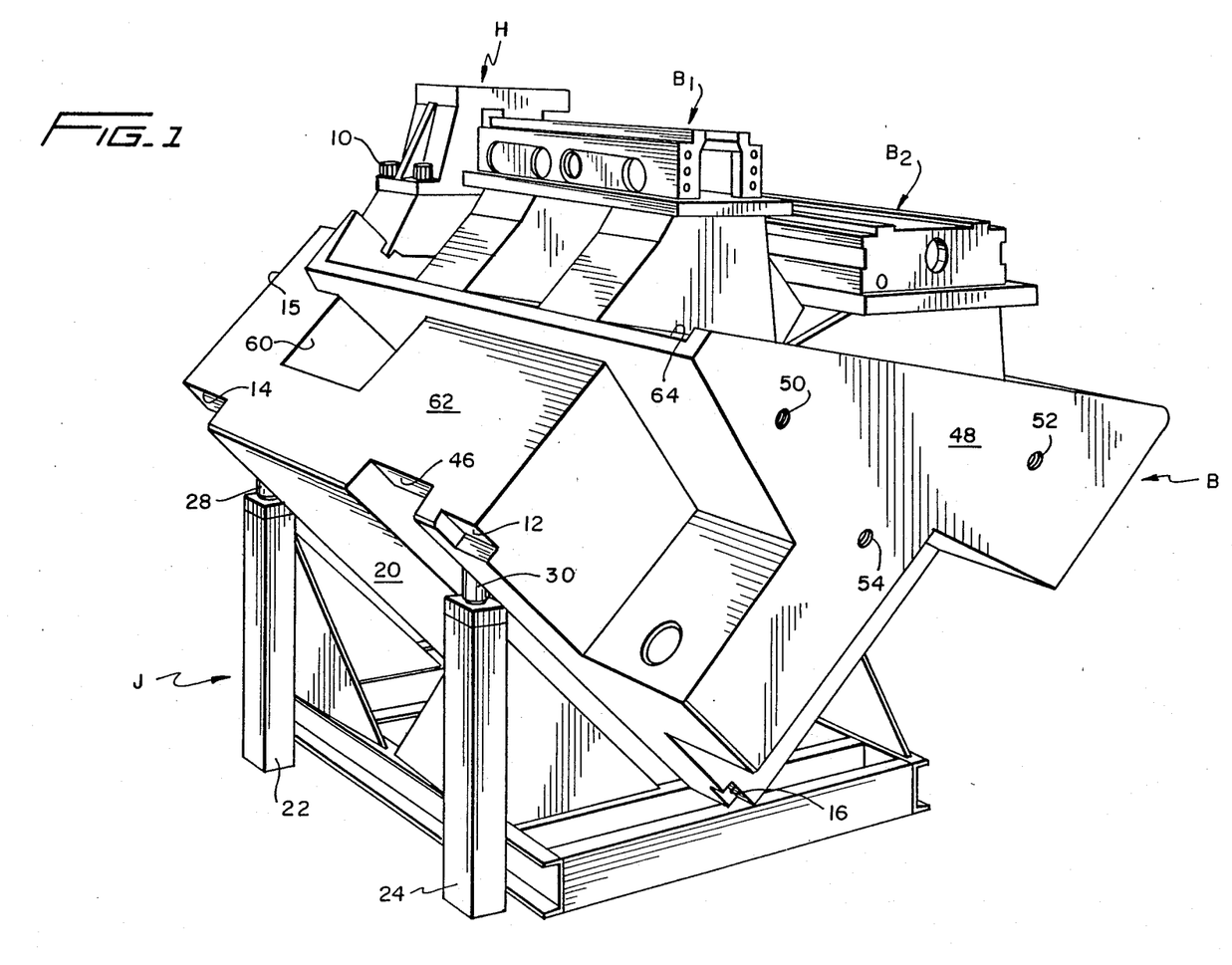
FIG. 1 is a front perspective view of the machine tool base assembly of the invention in the horizontal position.

Machine tool base B, as best shown in FIG. 1, is supported in a first position or orientation by jig J. Bedways B1 and B2 are mounted to base B, as is headstock support H. The headstock support H is, preferably, bolted to base B by bolts 10, while the bedways B1 and B2 are grouted, as further explained.

Figure 10:
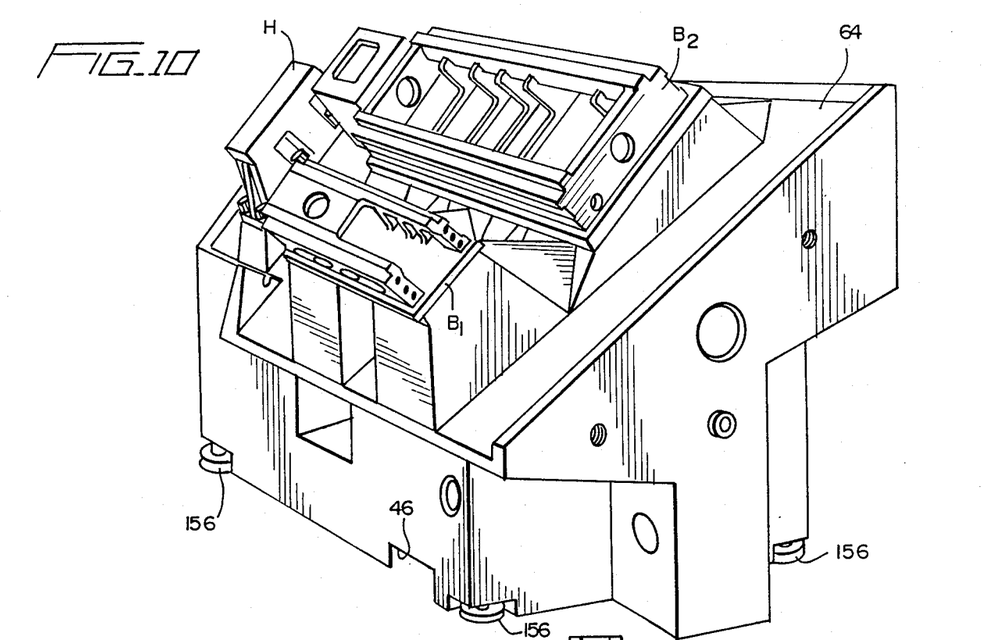
FIG. 10 is a perspective view of the machine tool base assembly of FIG. 1 in the operational position.
Figure 11:
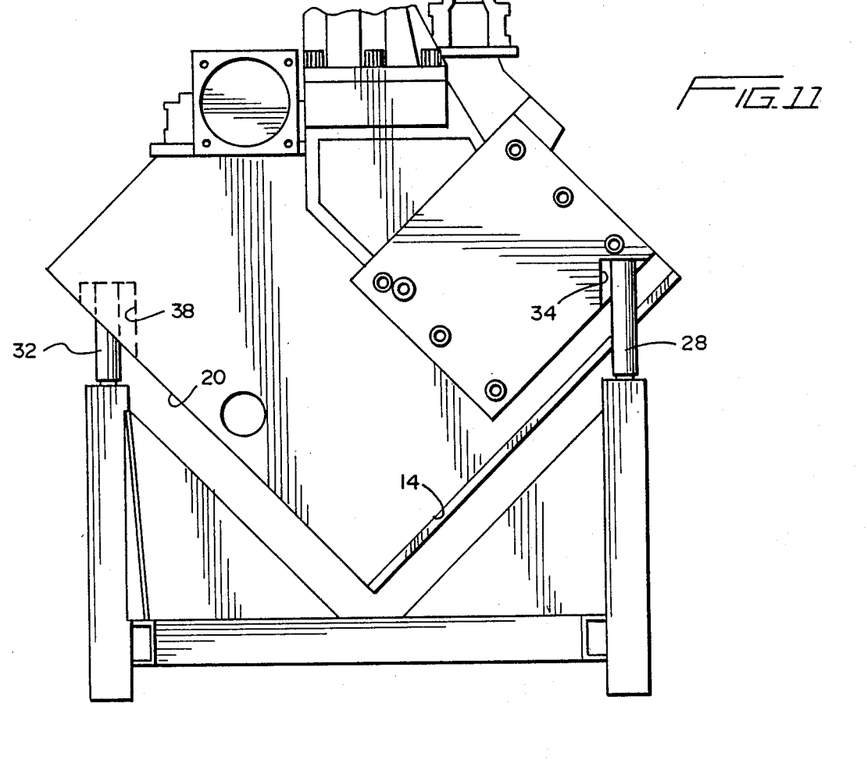
FIG. 11 is a side elevational view of FIG. 2.

The bed B is, preferably, of a cementitious material having controlled porosity. Control of base porosity allows the vibration dampening coefficient of the base B to be regulated. Base B preferably has recesses 12 and 16 in which leveling legs are positioned. Similarly, base B has recess 14 along side 15 thereof, and the recess 14 also has means which receive leveling legs. The leveling legs cooperate with the bottom surface 20 to orient the base B in a second position, as best shown in FIG. 10.

Figure 2:
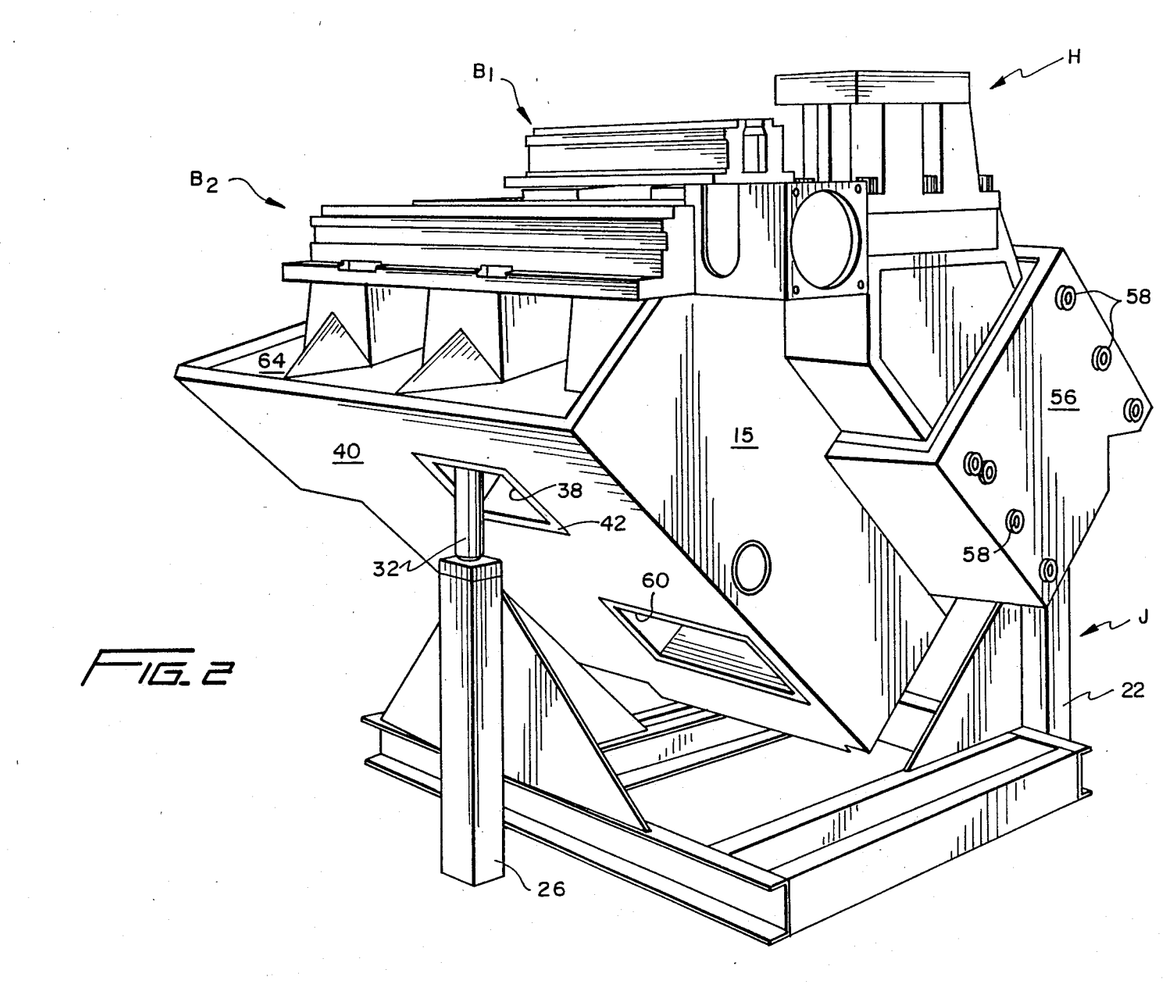
FIG. 2 is a rear perspective view of the machine tool base assembly of FIG. 1.

Jig J is ground supported and has vertical supports 22, 24 and 26, as best shown in FIGS. 1 and 2. Jack screws 28, 30 and 32 extend from supports 22, 24 and 26, respectively, and are vertically adjustable in order to level the base B in the position of FIG. 1. Preferably, each of the jack screws 28, 30 and 32 extends into a recess 34, 36 and 38, respectively, in the bse B. The base B thereby rests upon the distal end of each of the jack screws 28, 30 and 32 so that vertical adjustment thereof can be used to effectuate accurate leveling of the base B for mounting of the bedways B1 and B2. The recess 38 in rear surface 40 preferably has an insert 42 in order to minimize any adverse impact on the cementitious material of the base B.

Bottom 20 has central channel 46, as best shown in FIG. 1, which cooperates with recess 14 to permit the base B to be lifted by a lift truck or the like. Side surface 48 has threaded inserts 50, 52 and 54 to permit attachment of a housing (not shown) thereto. Likewise, side surface portion 56 has a plurality of threaded inserts 58, as best shown in FIG. 2, to permit a housing and related auxiliary equipment to be attached thereto. Also to be noted in FIG. 2 is chip removal opening 60 which extends from rear surface 40 through to front surface 62.

Figures 3, 4:
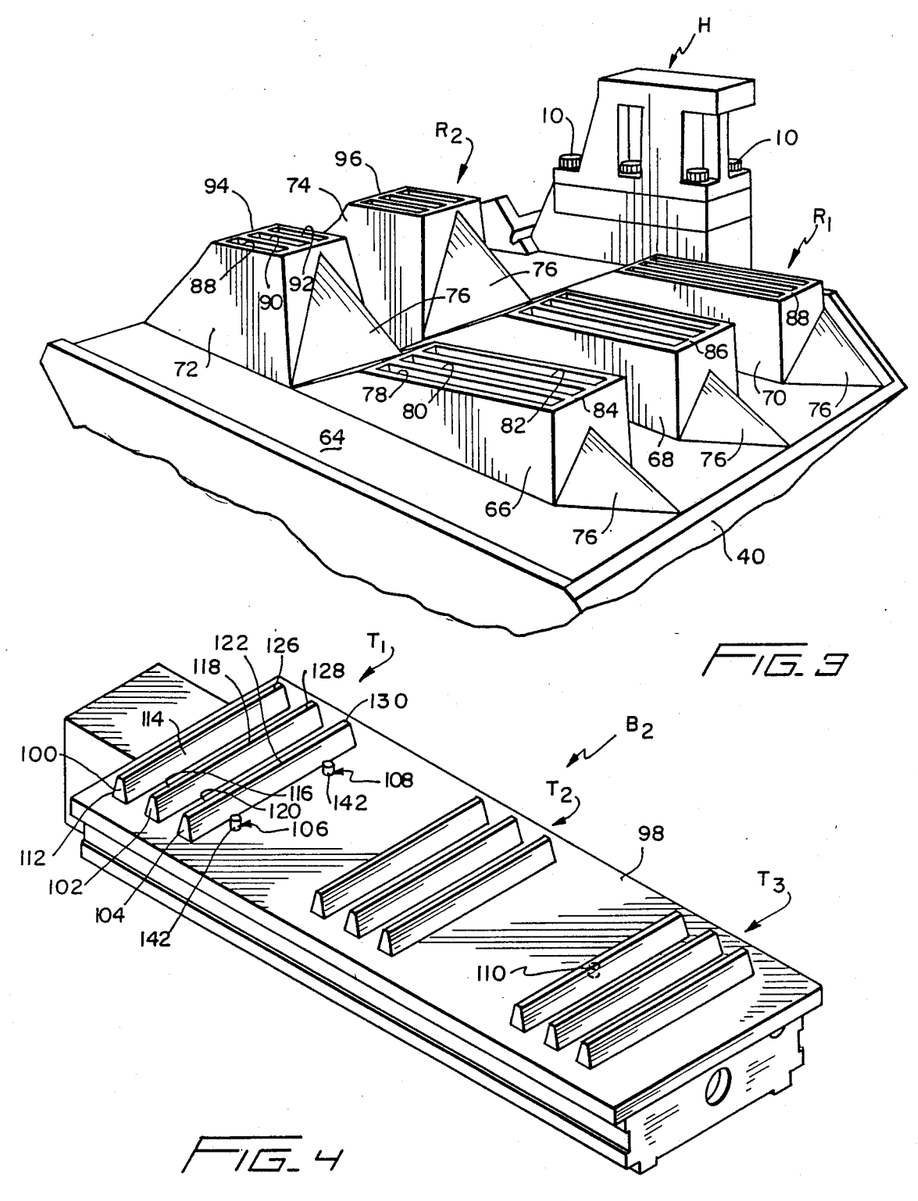
FIG. 3 is a fragmentary perspective view of the pedestals and headstock mounting assembly of the invention.
FIG. 4 is a bottom perspective view of a bedway of the machine tool of the invention.

Slant surface 64, as best shown in FIG. 3, has a series of pedestals 66, 68, 70, 72 and 74 arranged in parallel rows R1 and R2. Each of the pedestals 66, 68, 70, 72 and 74 has a pyrimidal extension 76 facing toward rear surface 40 so that chips, shavings, cutting fluid and the like will flow thereabout and along slant surface 64 so as to be removed when the base B is in the operating orientation of FIG. 10.

The pedestals 66, 68 and 70 of row R1 have a series of parallel recesses 78, 80 and 82 formed in the uniplanar upper surfaces 84, 86 and 88 thereof. The recesses in the pedestals 66, 68 and 70 are all disposed parallel to one another and have a uniform length substantially spanning the length of the upper surfaces 84, 86 and 88, as well as a uniform width. Similar recesses 89, 90 and 92 are formed in the uniplanar upper surfaces 94 and 96 of the pedestals 72 and 74. As noted, the rows R1 and R2 are parallel to one another so that the parallel recesses 88, 90 and 92 are similarly parallel to the recesses 78, 80 and 82 of the row R1. Likewise, the recesses 89, 90 and 92 have a length substantially equal to the length of the top surfaces 94 and 96, as well as a uniform width.

Bedway B2, as best shown in FIG. 4, has a lower surface 98 from which a series T1, T2 and T3 of tongues extend. Each of the series of tongues T1, T2 and T3 comprises tongue elements 100, 102 and 104. Vertically adjustable leveling elements 106, 108 and 110 extend through lower surface 98 from upper surface 105. The leveling elements 106, 108 and 110 form a triangular leveling assembly. Each of the leveling elements 106, 108 and 110 is adjacent to one of the tongues 100 or 104 of the series T1 or T3 in order to engage the upper surfaces 84 or 88, as appropriate. Bed B1 has a similar tongue system with leveling elements and it is believed that the disclosure of the bed B2 is sufficient for one skilled in the art to understand the operation thereof with regard to the bed B1.

Figure 5:
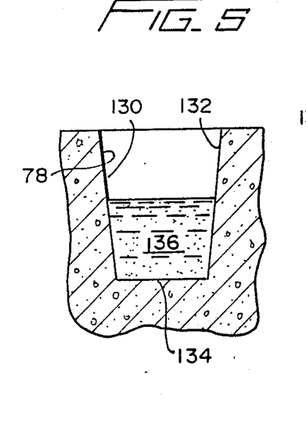
FIGS. 5, 6 and 7 disclose the process by which the bedway of FIG. 4 is secured to the pedestals of FIG. 3.
Figure 6:
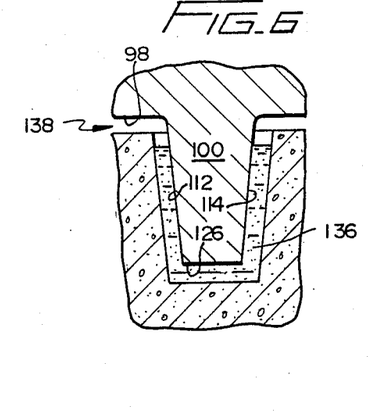
Figure 7:
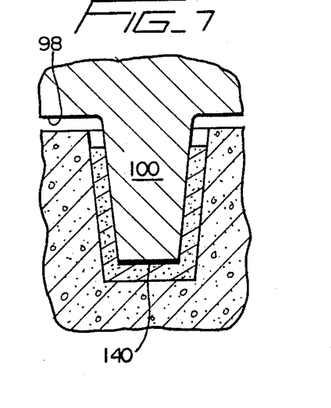
Figure 8:
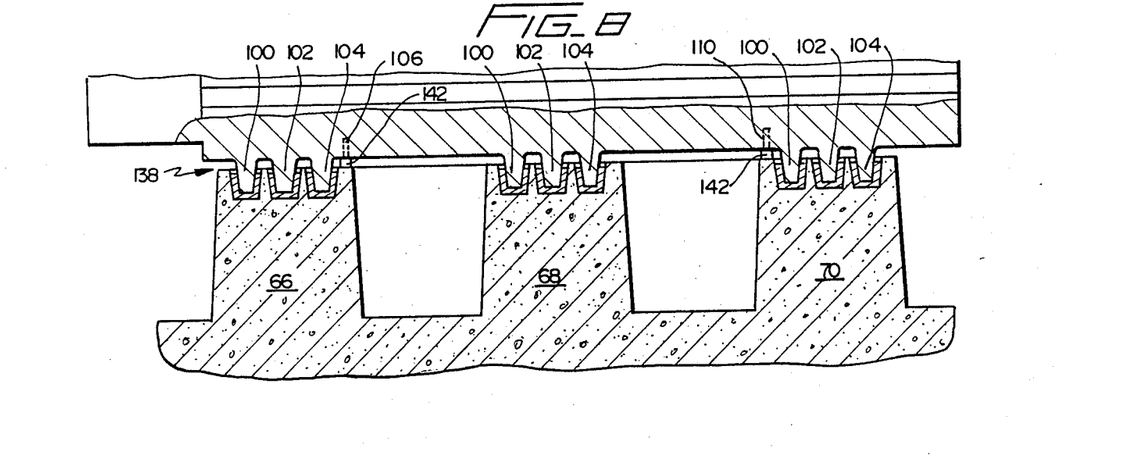
FIG. 8 is a fragmentary rear elevational view, with portions broken away, of the bedway of FIG. 4 mounted to its pedestals.
Figure 9:
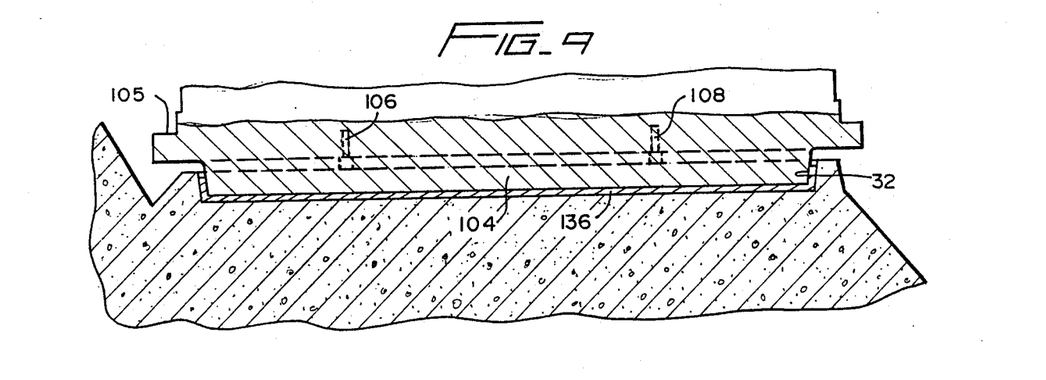
FIG. 9 is a fragmentary side elevational view with portions broken away and other portions shown in phantom disclosing the leveling assembly of the invention.

FIGS. 5, 6 and 7 disclose the mechanism by which the tongues 100, 102 and 104 of the bed B2 are secured within the grooves or recesses 78, 80 and 82 of the pedestals 66, 68 and 70. Only one groove 78 and its cooperating tongue 100 is explained with regard to FIGS. 5, 6 and 7, although those skilled in the art will understand that a like procedure is used with regard to the tongues 102 and 104 of each of the sets T1, T2 and T3. Similar considerations likewise apply to securing the bedway B1 to the pedestals 72 and 74.

We have found it important to control the shrinkage forces generated by the material used to secure the tongues 100, 102 and 104 within the grooves 78, 80 and 82. For this reason, the side surfaces 112 and 114 of the tongue 100, the side surfaces 116 and 118 of the tongue 102, and the side surfaces 120 and 122 of the tongue 104 are sandblasted in order to cause roughening thereof. The distal surfaces 124, 126 and 128 of the tongues 100, 102 and 104, respectively, are protected during the sandblasting procedure so as to be relatively smooth as a result.

Also, the side surfaces 130 and 132 of each of the grooves or recesses 78, 80 and 82 are sandblasted, while the lower surface 134 thereof is protected. Thereby, the side surfaces 130 and 132 are relatively rougher than the smooth bottom surface 134.

A predetermined quantity of a fluidic hardenable grout material is puddled into each of the grooves or recesses 78, 80 and 82 of each of the pedestals 66, 68 and 70. The grout material, such as the material 136 of FIG. 5, fills approximately one half of the respective groove or recess. We have found that suitable grout if manufactured under the name Silver 500 Precision Assembler and is distributed by Philadelphia Resins Inc. The grout material has minimum shrinkage and a vibration dampening characteristic which is dissimilar from that of the cementitious material of which base B is manufactured, and of the metallic material from which the bedways B1 and B2 are manufactured. Likewise, the coefficient of thermal expansion of the grout material, when hardened, is dissimilar from that of the cementitious material of base B and from the metallic material of the bedways B1 and B2. We have found that maximum vibration dampening is achieved since the natural resonance of the three materials cannot be very easily tuned.

Insertion of the tongue 100 into the groove or recess 78, as best shown in FIG. 6, causes the grout material 136 to rise upwardly within the groove or recess 78. It can be seen in FIGS. 6 and 7 that the grout material 136 does not rise by an amount sufficient to contact lower surface 98 of bedway B2. Furthermore, the leveling elements 106, 108 and 110 rest upon the respective surfaces 84 and 86 and thereby position the distal surface 126 above the underlying lower surface 134. In this way, an air gap 138 between the lower surface 98 and the upper surfaces 84, 86 and 88 is created. This air gap 138 provides an additional thermal insulation layer between the bedway B1 and the base B. Also, the tongues 100, 102 and 104 do not contact the underlying surfaces 134 so that intimate contact between the bedway B2 and the base B is avoided. The grout material 136 is a good thermal insulator. Between the air gap 138 and the grout material 136, a good thermal barrier is created so that thermal stresses are minimized and are substantially prvented from being transmitted from the bedway B2 to the base B, or vice verse. The same is true for vibrations.

We have found it advantageous to apply a release agent 140 to the distal surfaces 124, 126 and 128 of each of the tongues 100, 102 and 104. The release agent 140 may be a paint, an epoxy or a primer which has little or no affinity for the grout material 136. The surfaces 130, 132 and 134 of the grooves or recesses 78, 80 and 82 contain a resin rich layer which provides a smooth surface which is sandblasted, at least with regard to the surfaces 130 and 132. The combination of juxtaposed relatively rough side surfaces and juxtaposed smooth lower surfaces causes the grout material 136 to bind the side surfaces to each other while not binding the bottom or lower surfaces together. In this way, all shrinkage forces are directed horizontally, thereby substantially eliminating vertical deflection as could occur if there were vertical shrinkage forces. Should the vertical shrinkage forces not be controlled, then there would be a tendency for the grout material 136 to pull the surfaces 126 and 134 together, thereby deforming the bedway B2 from the horizontal leveled position.

We have found it important to place a polymeric member 142 at the base of each of leveling elements 106, 108 and 110. The polymeric member 142, which preferably is made of nylon, engages the respective surface 84 or 88 and absorbs whatever minimal vertical shrinkage may occur. Should these polymeric members 142 not be present, then we have experienced some difficulty in maintaining positive horizontal alignment of the bedways B1 and B2 throughout the lengths thereof, possibly due to thermal effects during curing of the grout material 136.

Figure 12:
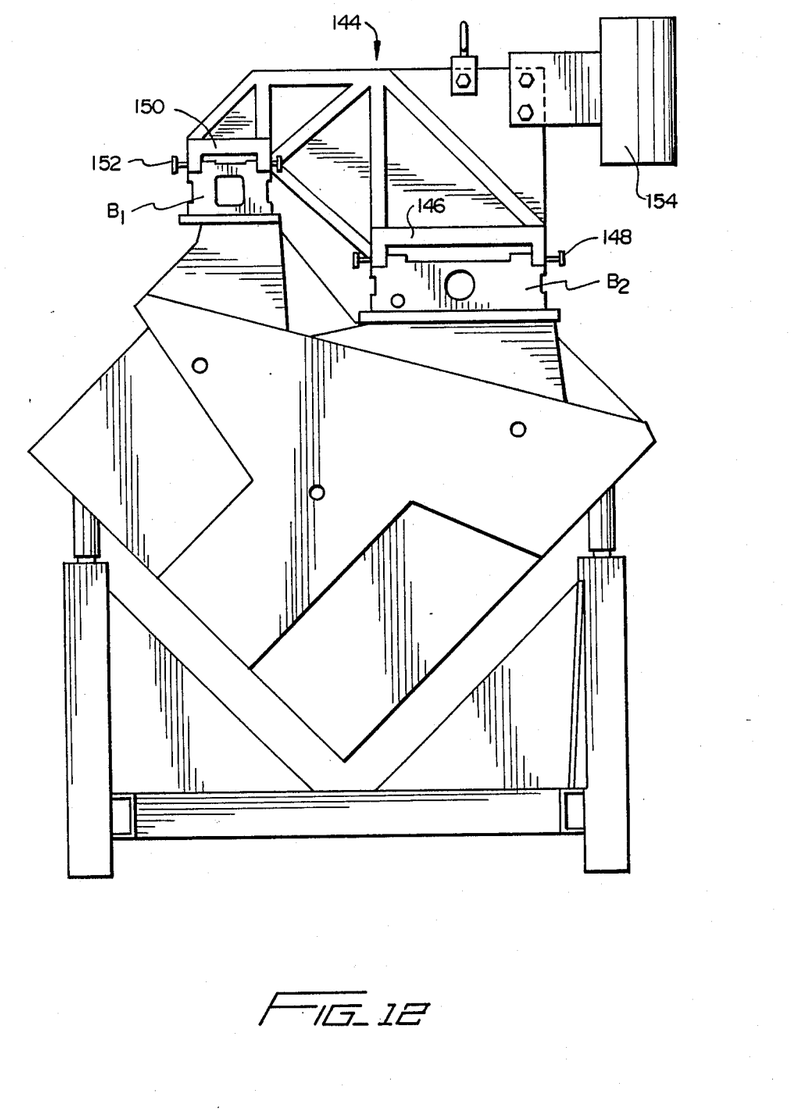
FIG. 12 is a side elevational view of FIG. 1 further disclosing a fixture used to set the second bedway.

We have found it important to permit the bedway B2 to be positively secured to the base B prior to attempting to set the bedway B1 on its pedestals 72 and 74. A jig or fixture 144, as best shown in FIG. 12, has a first end portion 146 secured to bedway B2 by clamps 148. A second end portion 150 thereof, as best shown in FIG. 12, is secured to bedway B1 by means of clamps 152. A counterweight 154 extends from jig 144 and is disposed beyond and above bedway B2 in order to minimize and eliminate the weight of jig 144 pressing onto bedway B1 during the curing process.

We have found use of the jig 144 to be an effective way of positively aligning the bedway B1 relative to the bedway B2. Naturally, a plurality of jigs 144 are disposed the length of bedway B2 and secured to bedway B1 for assuring proper positioning and alignment of the bedway B1 relative to the bedway B2. Those skilled in the art understand that the bedways B1 and B2 must be maintained parallel and in proper alignment for the exacting tolerance required of the machine tool to be maintained. Any deviation from the parallel relation will result in a diminishment of accuracy.

As noted, it is absolutely imperative that the upper surfaces 84, 86, 88, 94 and 96 of the pedestals 66, 68, 70, 72 and 74, respectively, be horizontal and parallel to each other in order to properly align the bedways B1 and B2. For this reason, we utilize the jig J in order to achieve accurate positioning of the base B so that the pedestals of the rows R1 and R2 are disposed in parallel. The jack screws 28, 30 and 32, by bearing upon the base B, and by being arranged in a triangular leveling arrangement, permit the base B to be accurately positioned and trued. Once that is done, then the bedway B2 may be affixed to the pedestals 66, 68 and 70 as previously described. After the grout 136 secures the bedway B2 to the base B, then jigs 144 may be used to properly position the bedway B1 over the pedestals 72 and 74. The jigs 144 compensate for the differences in height between the upper planar surfaces 84, 86 and 88 of the row R1 and the upper planar surfaces 94 and 96 of the row R2.

Once the bedways B1 and B2 have been thoroughly secured to their respective pedestals, then the base B may be reoriented into the second position wherein the surface 64 is disposed at a substantial angle to the horizontal, as best shown in FIG. 10. We have found that the surface 64 should be at an angle of between 30° to about 65° to the horizontal in order to achieve adequate flow of chips, shaving and cutting fluid between the spaced apart pedestals. Furthermore, it can be noted that the pedestal 72 is in alignment with the pedestal 66, while the pedestal 74 is in alignment with the pedestal 68, thereby eliminating flow blockage. The leveling feet 156, as best shown in FIG. 10, can be vertically adjusted to take into account any irregularities in the floor on which the base B is set.

We have found that a machine tool having a base B and bedways B1 and B2 affixed thereto, as described, has superior vibration dampening and thermal expansion characteristics. We believe that the vibration dampening is enhanced because of the use of three dissimilar materials; namely, the metal forming the bedways B1 and B2, the grout material, and the cementitious material forming the base B. Furthermore, elevation of the bedways B1 and B2 upon the pedestals 66, 68, 70, 72 and 74 helps to break up and prevent vibration patterns from being established in the respective bedways. Any vibration established in the integral pedestals of the base B must be directed downwardly into the base prior to impinging upon any immediately adjacent pedestal. The net result is a substantial diminishment in vibration, and therefore an increased capacity to make cuts of extremely small tolerances.

Likewise, the air gap 138 in combination with the failure of the bedways B1 and B2 to make intimate contact with the base B helps to isolate the bedways B1 and B2 from thermal effects emanating from the base B. The base B is a large heat sink which is thermally isolated, to a large degree, from the bedways B1 and B2 by the air gap 138, the grout material 146 and the lack of intimate contact between the bedways B1 and B2 and the base B. The net result is that dimensional changes on account of thermal stresses are minimized.

While this invention has been described as having a preferred design, it is understood that it is capable of further uses, modifications or additions coming within known or customary practice to which the invention pertains, and as may be applied to the central features hereinbefore set forth, and fall within the scope of the invention and the limits of the appended claims.

What we claim is:

1. A machine tool assembly, comprising:

(a) a cementitious base having a plurality of spaced grooves formed therein, each groove has an opening disposed on a plane common to said grooves;
(b) bedway means have a lower planar surface from which a plurality of tongues extend;
(c) said bedway means disposed relative to said base so that each of said tongues is disposed in one of said grooves;
(d) resilient means disposed between and engaged with said base and said bedway means for spacing said lower planar surface from said common plane and for absorbing forces tending to cause said bedway means to move relative to said common plane; and,
(e) grout means substantially filling each of said grooves throughout the length thereof for securing said tongues in said grooves and thereby said bedway means to said base.

2. The assembly of claim 1, wherein:
(a) said base comprised of a first material having a first vibration damping factor;
(b) said grout means comprised of a second material having a second vibration damping factor; and,
(c) said bedway means comprised of a third material having a third vibration damping factor.

3. The assembly of claim 2, wherein:
(a) said grout means is fluidic in a first state and hardened in a second state; and,
(b) said bedway means comprised of metal.

4. The assembly of claim 1, wherein:
(a) there are three resilient means, and said resilient means are disposed in a triangular array.

5. The assembly of claim 4, wherein:
(a) two of said resilient means are proximate a first tongue, and the other resilient means is proximate a second tongue spaced from said first tongue.

6. The assembly of claim 1, wherein:
(a) each of said grooves has oppositely disposed side surfaces and a bottom surface, and at least said side surfaces are roughened; and,
(b) each of said tongues has oppositely disposed side surfaces and a bottom surface, said tongue side surfaces are roughened and a release agent is disposed on each tongue bottom surface so that adhesive forces generated by said grout means are directed parallel to said common plane and thereby movement of said bedway means relative to said base is minimized.

7. The assembly of claim 6, wherein:
(a) said release agent is selected from the group consisting of paint, epoxy and primer.

8. The assembly of claim 6, wherein:
(a) said tongue and groove side surfaces are sand blasted.

9. The assembly of claim 1, wherein:
(a) said base has a plurality of integral spaced pedestals extending from a first surface thereof, and each of said pedestals terminates in a flat surface lying on said common plane; and,
(b) each of said grooves opens on the associated flat surface.

10. The assembly of claim 9, wherein:
(a) there are a uniform number of grooves for each pedestal, and said grooves are disposed in parallel and have common dimensions.

11. The assembly of claim 10, wherein:
(a) the grooves of each pedestal are uniformly spaced.

12. The assembly of claim 11, wherein:
(a) said resilient means engage one of said flat surfaces proximate one of the associated grooves.

13. The assembly of claim 1, wherein:
(a) adjustable leveling means are operably associated with said bedway means and extend therefrom toward said base; and,
(b) said resilient means are operably associated with said leveling means and interposed between said leveling means and said base so that said leveling means engage said resilient means and not said base.

14. The assembly of claim 1, wherein:
(a) said grooves are disposed in parallel and have common dimensions; and,
(b) said tongues are disposed in parallel and have common dimensions.

15. A machine tool assembly, comprising:
(a) a cementitious base has a first surface from which a plurality of spaced first pedestals extend, each of said first pedestals terminates in a flat surface and said flat surfaces lie on a common plane;
(b) a plurality of spaced parallel grooves are formed in each flat surface, and the grooves of said first pedestals are parallel;
(c) metallic bedway means are disposed above said base, said bedway means has a lower surface from which a plurality of tongues extend, each of the tongues is positioned in one of said grooves, and said lower surface is spaced from the associated flat surfaces; and,
(d) grout means disposed in each of said grooves securing each of said tongues in the associated groove and said grout means not engaging said lower surface so that the securing forces are oriented parallel to said flat surfaces.

16. The assembly of claim 15, wherein:
(a) a plurality of spaced second pedestals extend from said first surface, each of said second pedestals terminates in a flat surface and said second pedestals flat surfaces lie on a second common plane vertically spaced relative to said first mentioned common plane;
(b) a plurality of spaced parallel second grooves are formed in said second pedestals flat surfaces, said second grooves are parallel to said first mentioned grooves;
(c) second metallic bedway means are disposed above said base, said second bedway means has a lower surface from which a plurality of second tongues extend and each second tongue is positioned within one of said second grooves and said second bedway means lower surface is spaced from the associated second pedestals flat surfaces; and,
(d) grout means disposed in each of said second grooves securing each of said second tongues in the associated groove and said grout means not engaging said second bedway means lower surface so that the securing forces are oriented parallel to the associated second pedestal flat surfaces.

17. The assembly of claim 16, wherein:
(a) said second pedestals flat surfaces and said first pedestals flat surfaces are angularly disposed relative to said first surface.

18. The assembly of claim 17, wherein:
(a) each of said second pedestals is aligned with one of said first pedestals.

19. The assembly of claim 18, wherein:

(a) there are three first pedestals and two second pedestals, and said first and second pedestals are disposed in spaced parallel rows.

20. The assembly of claim 15, wherein:
(a) leveling means are operably associated with said bedway means and extend therefrom for engagement with associated ones of said flat surfaces; and,
(b) there are three leveling means, with said leveling means disposed in a triangular array, two of said leveling means being proximate a first tongue associated with one of said pedestals and the other leveling means being proximate a second tongue associated with another of said pedestals.

21. The assembly of claim 20, wherein:
(a) each of said leveling means includes a polymeric member at the distal end thereof engaged with the associated lower surface, said polymeric members for absorbing vertically oriented securing forces applied to said bedway means by said grout means.

22. The assembly of claim 15, wherein:
(a) there are three grooves disposed in each pedestal, and said grooves have uniform dimensions.

23. A reorientable machine tool base assembly, comprising:
(a) a machine tool base having a bottom surface, a rear vertical surface extending from said bottom surface and at least a first mounting surface angularly disposed relative to said bottom and rear surfaces;
(b) a plurality of first means operably associated with said bottom and rear surfaces for orienting said base in a first position wherein said mounting surface is disposed horizontally; and,
(c) a plurality of second means operably associated with said bottom surface for orienting said base in a second position wherein said mounting surface is disposed at a substantial angle to the horizontal.

24. The assembly of claim 23, wherein:
(a) two of said first means being operably associated with said bottom surface and one of said first means being operably associated with said rear surface so that a three point positioning system is formed.

25. The assembly of claim 24, wherein:
(a) each of said first means including a recess formed in the respective surface for receiving a support.

26. The assembly of claim 25, further comprising:
(a) a ground supported jig assembly has three supports, each support is vertically disposed and positionable in one of said first means for orienting said base in said first position.

27. The assembly of claim 26, wherein:
(a) each of said supports including a vertically movable member having an end portion bearing on the associated first means so that movement of said members permits said mounting surface to be adjusted.

28. The assembly of claim 23, wherein:
(a) said base comprised of a cementitious material.

29. A machine tool assembly, comprising:
(a) a cementitious base having a plurality of spaced grooves formed therein, each groove having an opening disposed on a plane common to said grooves;
(b) bedway means have a lower planar surface from which a plurality of tongues extend;
(c) said bedway means disposed relative to said base so that each of said tongues is disposed in one of said grooves;
(d) resilient means disposed between and engaged with said base and said bedway means for spacing said lower planar surface from said common plane and for absorbing forces tending to cause said bedway means to move relative to said common plane;
(e) grout means substantially filling each of said grooves throughout the length thereof for securing said tongues in said grooves and thereby said bedway means to said base;
(f) adjustable leveling means operably associated with said bedway means and extending therefrom toward said base; and,
(g) said resilient means being operably associated with and interposed between said leveling means and said base so that said leveling means engage said resilient means and not said base.

30. A machine tool assembly, comprising:
(a) a cementitious base having a plurality of spaced grooves formed therein, each groove having an opening disposed on a plane common to said grooves;
(b) bedway means have a lower planar surface from which a plurality of tongues extend;
(c) said bedway means disposed relative to said base so that each of said tongues is disposed in one of said grooves;
(d) resilient means disposed between and engaged with said base and said bedway means for spacing said lower planar surface from said common plane and for absorbing forces tending to cause said bedway means to move relative to said common plane;
(e) grout means substantially filling each of said grooves throughout the length thereof for securing said tongues in said grooves and thereby said bedway means to said base;
(f) each of said grooves has oppositely disposed side surfaces and a bottom surface, and at least said side surfaces are roughened; and,
(g) each of said tongues has oppositely disposed side surfaces and a bottom surface, said tongue side surfaces are roughened and a release agent is disposed on each tongue bottom surface so that adhesive forces generated by said grout means are directed parallel to said common plane and thereby movement of said bedway means relative to said base is minimized.

* * * * *